US012506959B2

(12) United States Patent
Ganguly et al.

(10) Patent No.: US 12,506,959 B2
(45) Date of Patent: Dec. 23, 2025

(54) DYNAMIC CAPTURE PARAMETER PROCESSING FOR LOW POWER

(71) Applicant: Google LLC, Mountain View, CA (US)

(72) Inventors: Shamik Ganguly, San Jose, CA (US); Emily Barbara Cooper, San Francisco, CA (US); Gary Lee Vondran, Jr., San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/819,154

(22) Filed: Aug. 11, 2022

(65) Prior Publication Data
US 2023/0051671 A1 Feb. 16, 2023

Related U.S. Application Data

(60) Provisional application No. 63/260,206, filed on Aug. 12, 2021, provisional application No. 63/260,207, filed on Aug. 12, 2021.

(51) Int. Cl.
*H04N 23/667* (2023.01)
*G06F 16/532* (2019.01)
(Continued)

(52) U.S. Cl.
CPC ......... *H04N 23/667* (2023.01); *G06F 16/532* (2019.01); *G06F 16/538* (2019.01);
(Continued)

(58) Field of Classification Search
CPC ...... H04N 23/667; H04N 7/183; H04N 23/80; H04N 23/815; H04N 23/60; G06F 16/532;
(Continued)

(56) References Cited

U.S. PATENT DOCUMENTS 9,007,490 B1 * 4/2015 Yuan ........................ G06F 3/005
348/241
9,600,741 B1 * 3/2017 Su ............................ G06T 5/50
(Continued)

FOREIGN PATENT DOCUMENTS

CN 109117830 A 1/2019
JP 2006054519 A 2/2006
(Continued)

OTHER PUBLICATIONS

International Search Report and Written Opinion for PCT Application No. PCT/US2022/074912, mailed on Nov. 25, 2022, 12 pages.
(Continued)

*Primary Examiner* — Kyu Chae
(74) *Attorney, Agent, or Firm* — Brake Hughes Bellermann LLP

(57) ABSTRACT

In one general aspect, a method can include capturing, using an image sensor, a first raw image at a first resolution, converting the first raw image to a digitally processed image using an image signal processor, and analyzing at least a portion of the digitally processed image based on a processing condition. The method can include determining that the first resolution does not satisfy the processing condition; and triggering capture of a second raw image at the image sensor at a second resolution greater than the first resolution.

21 Claims, 9 Drawing Sheets

(51) Int. Cl.
*G06F 16/538* (2019.01)
*G06V 10/25* (2022.01)
*G06V 30/14* (2022.01)
*G06V 30/148* (2022.01)
*G06V 30/19* (2022.01)
*H04N 7/18* (2006.01)
*H04N 23/80* (2023.01)

(52) U.S. Cl.
CPC .......... *G06V 10/25* (2022.01); *G06V 30/1444* (2022.01); *G06V 30/15* (2022.01); *G06V 30/191* (2022.01); *H04N 7/183* (2013.01); *H04N 23/80* (2023.01); *H04N 23/815* (2023.01)

(58) Field of Classification Search
CPC .. G06F 16/538; G06V 10/25; G06V 30/1444; G06V 30/15; G06V 30/191; G06V 10/75
See application file for complete search history.

(56) References Cited

U.S. PATENT DOCUMENTS

| | | | |
|---|---|---|---|
| 10,402,790 B1* | 9/2019 | Clark | G06Q 20/0425 |
| 2003/0086615 A1 | 5/2003 | Dance et al. | |
| 2006/0017752 A1 | 1/2006 | Kurzweil et al. | |
| 2009/0066782 A1 | 3/2009 | Choi et al. | |
| 2010/0289904 A1 | 11/2010 | Zhang et al. | |
| 2012/0134590 A1 | 5/2012 | Petrou et al. | |
| 2013/0129152 A1* | 5/2013 | Rodriguez Serrano | G06V 20/56 382/105 |
| 2014/0168478 A1* | 6/2014 | Baheti | G06V 30/1456 348/240.99 |
| 2014/0253701 A1 | 9/2014 | Wexler et al. | |
| 2015/0042562 A1 | 2/2015 | Kurzweil et al. | |
| 2016/0026870 A1* | 1/2016 | Wexler | G06V 10/776 382/103 |
| 2020/0125882 A1* | 4/2020 | Pribble | G06V 30/1478 |
| 2020/0195875 A1 | 6/2020 | Berkovich et al. | |
| 2021/0027590 A1 | 1/2021 | Lin et al. | |
| 2021/0034856 A1 | 2/2021 | Torres et al. | |
| 2022/0027111 A1* | 1/2022 | Lu | G06V 10/225 |
| 2024/0346783 A1 | 10/2024 | Lowry et al. | |

FOREIGN PATENT DOCUMENTS

| | | |
|---|---|---|
| JP | 2006277315 A | 10/2006 |
| JP | 2007156741 A | 6/2007 |
| JP | 2009077066 A | 4/2009 |
| JP | 2010081100 A | 4/2010 |
| JP | 2015102915 A | 6/2015 |
| JP | 2015537325 A | 12/2015 |
| JP | 2019046007 A | 3/2019 |
| JP | 2020087190 A | 6/2020 |
| JP | 2021507277 A | 2/2021 |
| JP | 2023005660 A | 1/2023 |
| JP | 2024534007 A | 9/2024 |
| WO | 2017109998 A1 | 6/2017 |
| WO | 2018123360 A1 | 7/2018 |
| WO | 2020194778 A1 | 10/2020 |

OTHER PUBLICATIONS

International Search Report and Written Opinion for PCT Application No. PCT/US2022/074915, mailed on Nov. 23, 2022, 11 pages.
Office Action for Japanese Application No. 2024-508515 (with English translation), mailed Apr. 1, 2024, 14 pages.
Office Action for Japanese Application No. 2024-508516 (with English translation), mailed Mar. 4, 2025, 6 pages.

* cited by examiner

DYNAMIC CAPTURE PARAMETER PROCESSING FOR LOW POWER

RELATED APPLICATIONS

This application claims priority to and the benefit of U.S. Provisional Application No. 63/260,206, filed Aug. 12, 2021, and of U.S. Provisional Application No. 63/260,207, filed Aug. 12, 2021, both of which are incorporated herein by reference in their entireties.

TECHNICAL FIELD

This description generally relates to methods, devices, and algorithms used to process image content.

BACKGROUND

Computer vision techniques enable computers to analyze and extract information from images. Such computer vision techniques may be costly with respect to processing and power consumption. As the demand to balance performance and power consumption on mobile computing devices continues to grow, device manufacturers are tasked with configuring devices to balance image degradation with device performance to avoid overtaxing the limits of mobile computing devices.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

This disclosure describes systems and methods for performing image processing that may enable computing devices (e.g., wearable computing devices) to efficiently perform (e.g., carry out) computer vision tasks. The systems and methods described herein can reduce (e.g., minimize) an amount of image data used when performing computer vision and image analysis tasks to reduce the use of particular hardware and/or device resources (e.g., memory, processors, network bandwidth, etc.). Configuring computing devices (e.g., head mounted device (HMD), augmented reality (AR) smart glasses) for a reduced use of resources can provide the advantage of allowing such devices to carry out relatively low-power computational tasks onboard the device and offload (e.g., push) complex and/or high-power processing onto a companion device (e.g., servers, mobile device connected with the computing device, other computers, etc.). For example, an initial assessment of the feasibility of optical character recognition (OCR) can be performed at the computing device (e.g., HMD), and when it is determined that an image can be captured with a desirable capture parameter (e.g., sufficient resolution) to perform OCR, the image can be sent (e.g., wireless sent) to the companion device for additional (e.g., more detailed, more intensive) OCR processing.

In at least one general aspect, an image processing method can include capturing, using an image sensor, a first raw image at a first resolution, converting the first raw image to a digitally processed image using an image signal processor, and analyzing at least a portion of the digitally processed image based on a processing condition. The can include determining that the first resolution does not satisfy the processing condition, and triggering capture of a second raw image at the image sensor at a second resolution greater than the first resolution. The method can include any combination of the following.

In another general aspect, a non-transitory machine-readable, tangible medium stores instructions read and executed by one or more processors to perform an image processing method where the method can include capturing, using an image sensor, a first raw image at a first resolution, converting the first raw image to a digitally processed image using an image signal processor, and analyzing at least a portion of the digitally processed image based on a processing condition. The method can include determining that the first resolution does not satisfy the processing condition, and triggering capture of a second raw image at the image sensor at a second resolution greater than the first resolution. The method can include any combination of the following.

In yet another general aspect, a system can include a processor, and a memory device communicatively coupled to the processor and having stored therein a plurality of instructions, which when executed by the processor, cause the processor to capture, using an image sensor, a first raw image at a first resolution, convert the first raw image to a digitally processed image using an image signal processor, and analyze at least a portion of the digitally processed image based on a processing condition. The processor can be caused to determine that the first resolution does not satisfy the processing condition, and trigger capture of a second raw image at the image sensor at a second resolution greater than the first resolution.

Each of the aspects described above can include any combination of the following. In some implementations, the at least the portion of the digitally processed image includes a textual character. In some implementations, the at least the portion of the digitally processed image includes a real-world object. In some implementations, the processing condition is at least one of a pixel per character, height, or area condition. In some implementations, the first resolution for capturing the first raw image corresponds with a bin defined at the image sensor. In some implementations, the first resolution is a default resolution, the second resolution is defined based on an entry in a look-up table. In some implementations, the digitally processed image is a first digitally processed image captured at a computing device. The method can also include converting the second raw image to a second digitally processed image, determining that the second resolution satisfies the processing condition, and transmitting the second digitally processed image to a companion device to the computing device for further processing in response to the determining that the second resolution satisfies the processing condition.

BRIEF DESCRIPTION OF THE DRAWINGS

Like reference symbols in the various drawings indicate like elements.

DETAILED DESCRIPTION

Figure 1:
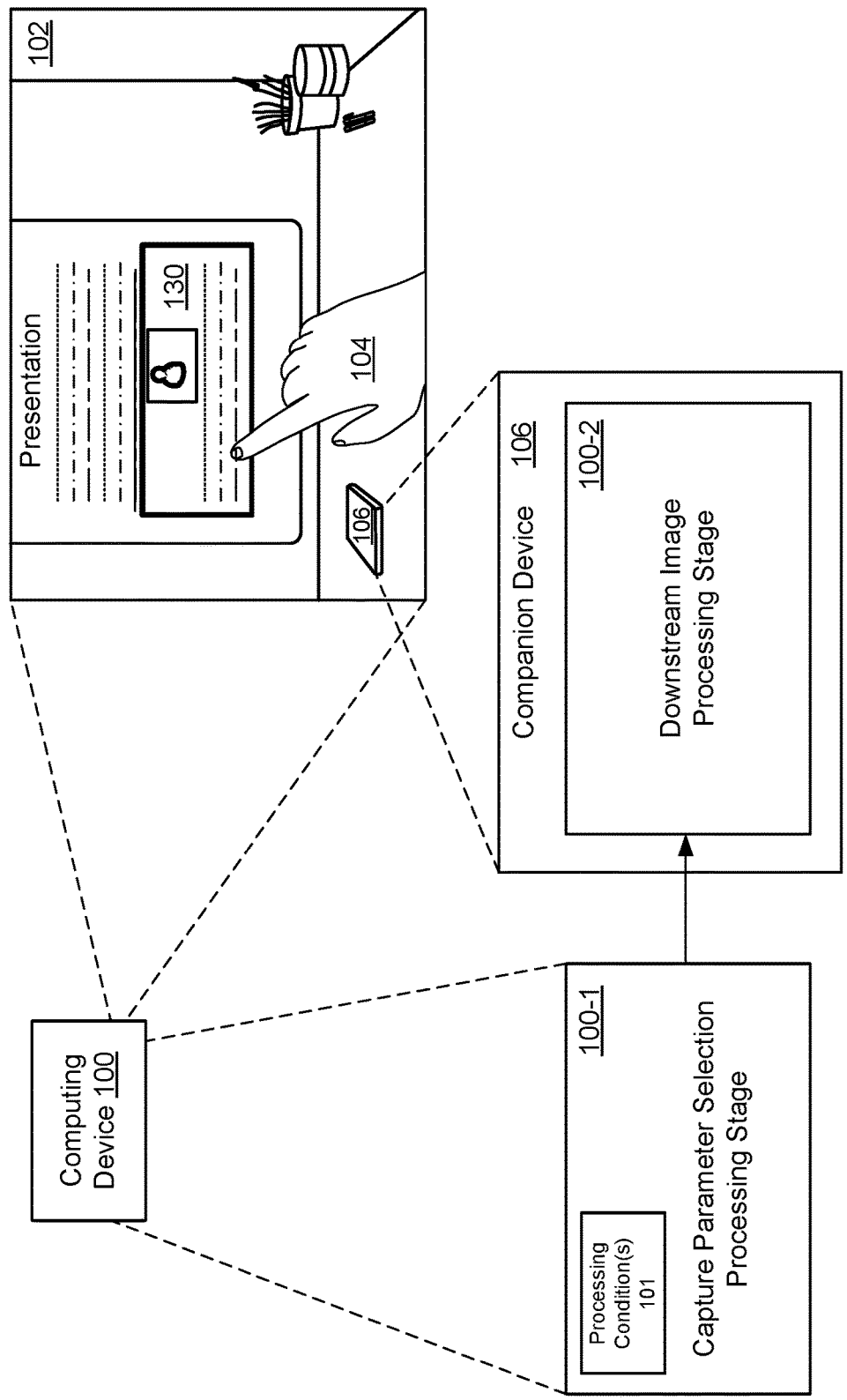
FIG. 1 is an example of a computing device for generating and processing image content using limited computational and/or power resources, according to implementations described throughout this disclosure.

This disclosure describes systems and methods for performing image processing that may enable computing devices (e.g., wearable computing devices) to efficiently perform (e.g., carry out) computer vision tasks. For example, the systems and methods described herein may utilize processors, sensors, neural networks, and/or image analysis algorithms to recognize text, symbols, and/or objects in images and/or extract information from the images. In some implementations, the systems and methods described herein can perform such tasks while operating in a reduced computational mode and/or reduced electrical power mode. For example, the systems and methods described herein can reduce (e.g., minimize) an amount of image data used when performing computer vision and image analysis tasks to reduce the use of particular hardware and/or device resources (e.g., memory, processors, network bandwidth, etc.).

Configuring computing devices (e.g., head mounted device (HMD), augmented reality (AR) smart glasses) for a reduced use of resources can provide the advantage of allowing such devices to carry out relatively low-power computational tasks onboard the device and offload (e.g., push) complex and/or high-power processing onto a companion device (e.g., servers, mobile device connected with the computing device, other computers, etc.).

For example, an initial assessment of the feasibility of optical character recognition (OCR) can be performed at the computing device (e.g., HMD), and when it is determined that an image can be captured with a desirable capture parameter (e.g., sufficient resolution) to perform OCR, the image can be sent (e.g., wireless sent) to the companion device for additional (e.g., more detailed, more intensive) OCR processing.

As another example, one or more capture parameters (e.g., a resolution, a number of pixels per character) for performing early stage of OCR (e.g., early stages of an OCR pipeline such as text recognition) can be performed at the computing device. When it is determined that an image can be captured with a desirable capture parameter to perform OCR, the image can be sent (e.g., wireless sent) to the companion device for detailed OCR processing. In some implementations, the detailed OCR processing (or other processing) can be performed at the computing device and the techniques described herein can help to conserve energy during at least some (e.g., during any) downstream processing.

In some implementations, initial low-power processing of an image can be used to determine a target capture parameter (e.g., minimum resolution, cropping to a region of interest (ROI)) for capturing an image that can be sent to another device for higher-power and/or more complex processing. The particular capture parameter can be determined based on one or more processing conditions. The initial processing to determine a target capture parameter can be referred to as a capture parameter selection processing stage and the later processing can be referred to as a downstream image processing stage.

As a specific example, at least a portion of an image can be captured at a first capture parameter and a determination can be made, at a capture parameter selection processing stage, that the first capture parameter does not satisfy a condition (e.g., is not high enough), based on a processing condition, to be processed at a later stage of processing. The processing condition can be a condition used to determine whether processing at a later stage of processing (e.g., downstream processing) can be performed in a desirable fashion. In response to the determination of the insufficiency of the first solution, the portion of the image can be captured at a second capture parameter and a determination can be made that the second capture parameter is sufficient, based on a processing condition, to be processed at a later stage of processing. The downstream image processing stage can be, for example, processing related to optical character recognition.

As another specific example, at least a portion of an image can be captured at a first capture parameter and a determination can be made, at a capture parameter selection processing stage, that the first capture parameter satisfies a condition (e.g., is high enough), based on a processing condition, to be processed at a later stage of processing. In response to the determination of the sufficiency, the portion of the image can be processed a downstream image processing stage (e.g., processing related to optical character recognition).

In some implementations, the capture parameter selection processing can be based on a particular region of interest determined using separate region of interest selection techniques. For example, instead of analyzing an entire image, a region of interest (ROI) can be identified in image data and one or more of those regions may be analyzed onboard a computing device. Reducing the amount of information to analyze while still maintaining accurate results may allow complex image processing tasks to be performed on the computing device without the resource burden of analyzing the entire image. In some implementations, the systems and methods described herein may be configured to be executed on a device to ensure such a device may perform efficient image processing tasks while reducing computational load and/or electrical power. For example, the systems and methods described herein may enable a device to perform object detection tasks, optical character recognition (OCR) tasks, and/or other image processing tasks while utilizing particular techniques to reduce power, memory, and/or processing consumption.

In some implementations, the systems and methods described herein may ensure that complex image processing computations may be executed on a device without assistance from other resources and/or devices. For example, conventional systems may request assistance from other communicably coupled mobile devices, servers, and/or off-board systems to perform computationally heavy image processing tasks. The systems and methods described herein provide an advantage of generating portions of images that may be operated upon by a device with less computational ability than a server, for example, while still providing full and accurate image processing abilities.

The systems and methods described herein may enable a computing device to use machine-learning intelligence (e.g., neural networks, algorithms, etc.) that utilize low power consumption and/or low processing consumption to carry out computer vision tasks such as object detection, movement tracking, facial recognition, OCR tasks, and the like.

FIG. 1 is an example of a computing device 100 (e.g., HMD) for generating and processing image content using limited computational and/or power resources, according to implementations described throughout this disclosure. In this example, the computing device 100 is depicted in the form of AR smart glasses. However, any form factor may be substituted and combined with the systems and methods described herein. In some implementations, the computing device 100 includes a system on chip (SOC) architecture (not shown) in combination with any or all of one or more sensors, low power island processors, high power island processors, core processors, encoders, and the like.

In operation, the computing device 100 (also can be referred to as a device) may capture an image of a scene 102 using, for example, a camera, image sensor, or the like. The device 100 may be worn and operated by a user 104. The scene 102 may include physical content as well as augmented reality (AR) content. The scene 102 is shown from the perspective of a view through the device 100. In some implementations, the computing device 100 may be communicably coupled with a companion device 106 (e.g., a mobile computing device).

In some implementations, the computing device 100 may be triggered to begin real-time image processing (e.g., real-time image and/or character recognition) in response to a request to identify image content from the scene 102. In a non-limiting example, the computing device 100 may be triggered to begin real-time image processing in response to a request to identify image content associated with optical data captured by a sensor included in the device 100. The request may be from a user (e.g., user 104) wearing device 100.

In operation, the computing device 100 may include a capture parameter selection processing stage 100-1. Initial low-power processing of an image, at the capture parameter selection processing stage 100-1 can be used to determine a target capture parameter (e.g., minimum resolution, cropping to region of interest (ROI)) for capturing an image of at least a portion of the scene 102 that is desirable for further processing (or for triggering further processing). The target capture parameter determined at the capture parameter selection processing stage 100-1 can be used to capture one or more additional images that can be sent to the companion device 106 for higher-power and/or more complex processing within a downstream image processing stage 100-2. Although the downstream image processing stage 100-2 is illustrated as being in the companion device 106 any of the processing of the downstream image processing stage 100-2 can be performed at the computing device 100.

The target capture parameter for capturing an image of at least a portion of the scene 102 can be determined based on one or more processing conditions 101 at the capture parameter selection processing stage 100-1. The target capture parameter can be a capture parameter optimized (based on the processing conditions) for processing the image at the downstream image processing stage 100-2. Specifically, the target capture parameter can be selected (e.g., converged upon) based on one or more of the processing conditions 101 being satisfied.

In some implementations, the target capture parameter can be selected based on an initial capture parameter for capturing content. In some implementations, the target capture parameter can be the same as, or can be identified to be the same as, the initial capture parameter. In some implementations, multiple intermediate capture parameters, in addition to an initial capture parameter, can be tested (e.g., considered against one or more processing conditions) until the target capture parameter is identified (e.g., converged upon). At least one of the intermediate capture parameters can be identified as the target capture parameter if the intermediate capture parameter satisfies one or more of the processing conditions 101.

In some implementations, content for processing by the capture parameter selection processing stage 100-1 can be targeted to a region of interest 130. In some implementations, a region of interest (e.g., region of interest refined by cropping) can be selected along with or after target capture parameter processing. In some implementations, the region of interest can be selected or processed at any element of the capture parameter selection processing stage 100-1 (e.g., image sensor, image signal processor, on-device processing, etc.)

As a specific example, the text within the scene 102 can be captured in a first image using an initial capture parameter representing a first resolution (low resolution, low resolution level). The capture parameter selection processing stage 100-1 can determine that the text within the first image does not satisfy a processing condition 101 (e.g., the characters in the text are below a pixels per character threshold (e.g., pixel height per character)). Because the processing condition 101 is not satisfied based on an analysis of the first image (e.g., text) by the capture parameter selection processing stage 100-1, an intermediate capture parameter representing a second resolution (higher resolution, high resolution level) can be used to capture a second image of the text within the scene. If the capture parameter selection processing stage 100-1 determines that the text within the second image satisfies the processing condition 101 (e.g., the characters in the text meet or exceed a pixels per character threshold), the second image of the captured text can be sent to a companion device for processing (e.g., OCR processing) within the downstream image processing stage 100-2.

In some implementations, multiple images can be captured simultaneously, or nearly simultaneously at different capture parameters. An assessment as to whether or not a first of the multiple images will satisfy one or more processing conditions 101 can be performed. The first of the multiple images can be an image that uses less processing resources (e.g., uses the least processing resources of the multiple images). If the first of the multiple images satisfies the one or more processing conditions 101, further assessment of other of the multiple images may not be needed. If the first of the multiple images does not satisfy the one or more processing conditions 101, an assessment as to whether or not a second of the multiple images will satisfy one or more processing conditions 101 can be performed. The second of the multiple images can be an image that uses more (e.g., incrementally more) processing resources than the first of the multiple images. Such processing of the multiple images can be performed until one of the multiple images is identified as satisfying the one or more processing conditions 101 while using the least amount of processing resources (from the multiple images).

Figure 2:
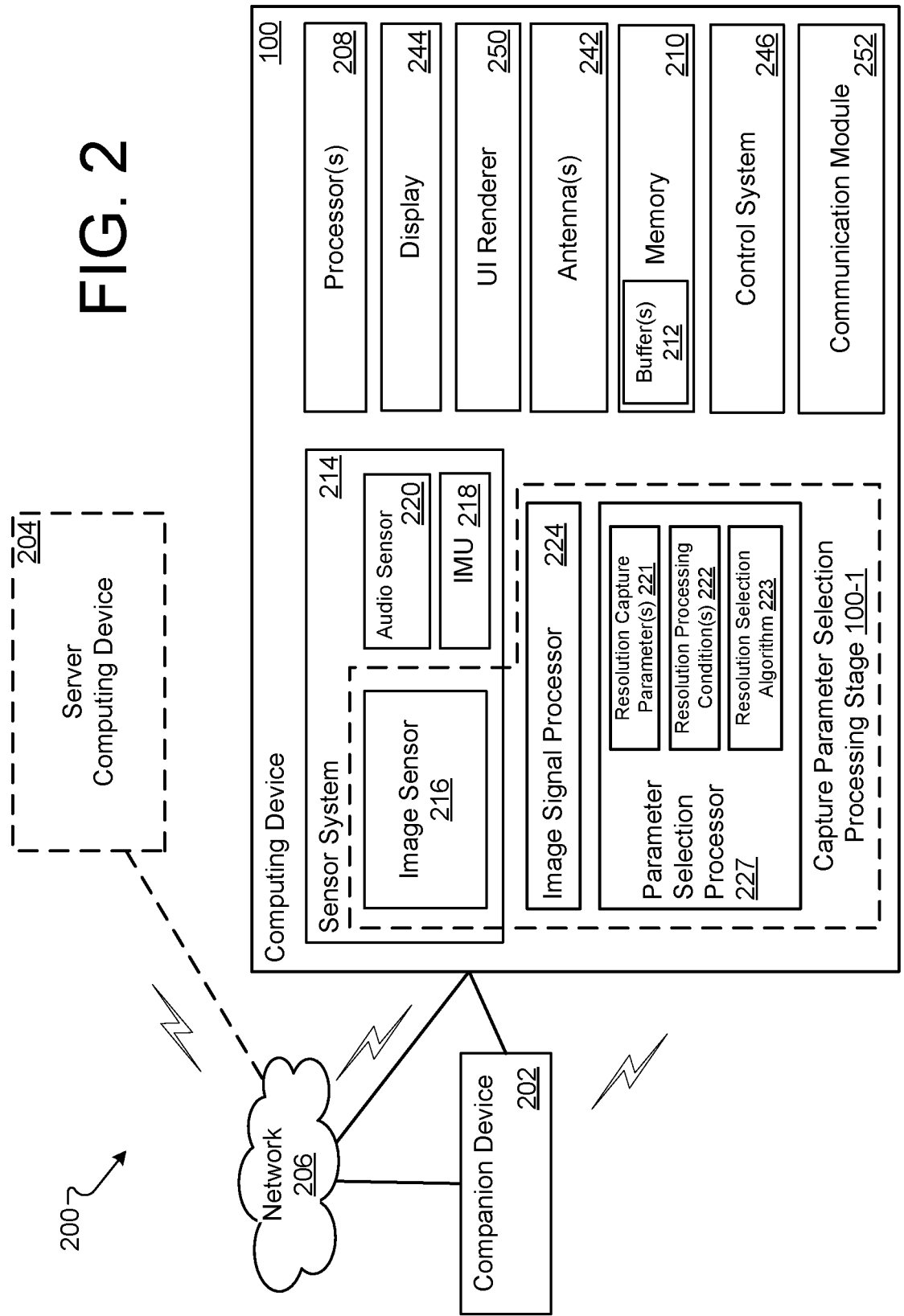
FIG. 2 illustrates a system for performing image processing on a computing device, according to implementations described throughout this disclosure.

FIG. 2 illustrates a system 200 for performing image processing on a computing device 100, according to implementations described throughout this disclosure. In some implementations, the image processing is performed on the computing device 100. In some implementations, the image processing is shared amongst one or more devices. For example, the image processing may be partially completed on the computing device 100, and partially completed on a companion device 202 (e.g., such as mobile computing device 106) and/or server computing device 204. In some implementations, image processing is performed on the computing device 100 and output from such processing is provided to the companion device 202 and/or the server computing device 204.

FIG. 2 illustrates an implementation of a capture parameter selection processing stage 100-1 included in the computing device 100. Although not shown, a downstream image processing stage 100-2 can be included in the companion device 202. In this implementation, the capture parameter selection processing stage 100-1 includes an image sensor 216, an image signal processor 224, and a parameter selection processor 227.

The image signal processor 224 can be configured to convert a raw image (e.g., raw image, analog image) captured by the image sensor 216 into a digitally processed image format that can be processed by the parameter selection processor 227. For example, the raw image can be an uncompressed image without some information for further image processing. The image signal processor 224 can process the raw image into a digital format that can be further processed by downstream processing such as the parameter selection processor 227. The image signal processor 224 can perform, for example, noise reduction, auto-white balance and color correction, color interpolation, gamma correction, etc. to produce the digitally processed image In some implementations, the image signal processor 224 can be part of the sensor system 214. To simplify the discussion, the conversion of images produced by the image sensor 216 into digital representations by the image signal processor 224 will generally be omitted from the description even though such conversion occurs before downstream processing (e.g., processing by the parameter selection processor 227). Accordingly, processing by downstream components is generally performed after digital processing by the image signal processor 224 even if not mentioned within the description herein.

The implementation shown in FIG. 2 will be discussed in the context of resolution (e.g., resolution capture parameters 221, resolution conditions 222, resolution selection algorithm 223) associated with an OCR process to focus the discussion and illustrate the principles in this description. Different types of capture parameters, conditions, and/or processes other than, or in addition to, resolution can be used in connection with the implementation in at least FIG. 2. For example, the techniques described herein can be applied to processing of any type (e.g., computer vision, machine learning) of real world object such, but not limited to, barcodes, products, signs, storefronts, landmarks, plants, food, faces, hands (e.g., pointing or holding), objects (e.g., cars, buildings, bicycles, books, people, . . . ), feature point tracking, and/or so forth.

The image sensor 216, image signal processor 224, and parameter selection processor 227 can function as a pipeline within the capture parameter selection processing stage 100-1. Image resolutions are reduced or minimized as early in the pipeline as possible to reduce or minimize energy consumption. For example, a minimum resolution image can be captured at the image sensor 216 so that processing at any downstream processing (e.g., the image signal process 224, parameter selection processor 227, communication module 252, companion device 202) can be reduced or minimized. Capturing images at the image sensor 216 at a higher resolution can result in increased power usage, increased latency (e.g., transmission latency), etc. at downstream processing.

As described above, the capture parameter selection processing stage 100-1 can be used to determine a target resolution capture parameter for capturing an image of at least a portion of the scene 102 that is desirable for further processing (and for power savings). The target resolution capture parameter determined at the capture parameter selection processing stage 100-1 can be used to capture one or more additional images that can be sent to the companion device 202 for higher-power and/or more complex OCR processing within a downstream image processing stage.

The resolution capture parameters 221 can represent a parameter that can be used by, for example, the image sensor 216 to capture an image. Although not shown, each of the different types of resolution capture parameters (e.g., initial, intermediate, and target resolution capture parameters) can be represented by, or generally referred to as, the resolution capture parameters 221. For example, an initial or default resolution capture parameter can be referred to as a resolution capture parameter 221. The resolution capture parameters 221 can represent, for example, different values or levels of resolution.

The capture parameter selection processing stage 100-1 can be configured to start capturing images using one or more initial capture parameters using the image sensor 216 and can adjust and/or define additional resolution capture parameter(s) (e.g., one or more intermediate capture parameters) until one or more target resolution capture parameter(s) is determined for further processing. In some implementations, the initial capture parameter can be identified as the target resolution capture parameter.

For example, the image sensor 216 can be configured to capture an image using an initial resolution capture parameter (e.g., a default resolution capture parameter, at a first resolution). The parameter selection processor 227 can be configured to determine whether content captured by the parameter selection processor 227 has a sufficient resolution for further processing by analyzing at least a portion of the content in the image. The sufficiency of the resolution can be determined based on one or more of the resolution processing conditions 222. Specifically, if the content in the image satisfies one or more of the resolution processing conditions 222 (e.g., if the resolution is sufficient for further processing), the parameter selection processor 227 identifies the initial resolution capture parameter as a target resolution capture parameter for capturing image content using the image sensor 216.

As another example, the image sensor 216 can be configured to capture an image using an initial resolution capture parameter (e.g., at a first resolution). The parameter selection processor 227 can be configured to determine whether content captured by the parameter selection processor 227 has a sufficient resolution for further processing by analyzing at least a portion of the content in the image. If the resolution is not sufficient for further processing, the parameter selection processor 227 identifies an intermediate resolution capture parameter.

After an initial resolution capture parameter is determined to not be appropriate for capturing an image by the image sensor 216 for downstream processing based on one or more resolution prosecuting conditions 222. A resolution selection algorithm 223 can be used to determine one or more intermediate resolution capture parameters until a target resolution capture parameter is identified. The resolution algorithm 223 can be based on pre-determined set of resolution capture parameters. The resolution algorithm 223 can be based on pre-determined order of resolution capture parameters. The resolution algorithm 223 can be based on identifying a resolution capture parameter that will result in minimal processing.

The resolution selection algorithm 223 can be, or can be based on, for example, a look-up table (LUT) that identifies a resolution capture parameter order after an initial resolution capture parameter. In other words, different capture parameters (e.g., capture parameter levels) can be determined using a look-up table. The look-up table can be used to quickly determine a desirable resolution capture parameter (or other type of capture parameter).

For example, a look-up table can include an initial resolution capture parameter (e.g., a default resolution capture parameter). If a first image captured based on the initial resolution capture parameter is not acceptable for further processing (e.g., downstream processing), a second image can be captured based on an intermediate resolution capture parameter identified within the look-up table. If the second image captured based on the intermediate resolution capture parameter is acceptable for further processing, further processing can be performed (and intermediate resolution capture parameter can be the final resolution capture parameter). If the second image captured based on the intermediate resolution capture parameter is not acceptable for further processing (e.g., downstream processing), a third image can be captured based on yet another intermediate resolution capture parameter identified within the look-up table. Processing can proceed, as described above in an iterative fashion, until a final resolution capture parameter is identified. Other parameters, other than resolution capture parameters, can be identified.

In some implementations, the resolution selection algorithm 223 can be based on a variety of algorithms and/or equations.

The computing device 100 includes a sensor system 214. The sensor system 214 includes the image sensor 216 configured to detect and/or obtain image data. In some implementations, the sensor system 214 includes multiple image sensors 216. As shown, the sensor system 214 includes one or more image sensors 216. The image sensor 216 may capture and record images (e.g., pixels, frames, and/or portions of images) and video.

In some implementations, the resolution (e.g., level of resolution) of the image sensor 216 can be defined through pre-defined (e.g., pre-programmed) binning (e.g., binning of pixels) of the image sensor 216. For example, binning of an increased number of pixels of the image sensor 216 can result in a decreased resolution or resolution level. Binning of an increased number of pixels can result in an increased resolution or resolution level.

Satisfaction of a per-pixel threshold, which is a type of processing condition (e.g., processing condition 101) can depend on many factors including distance and real-world image element size (e.g., actual font size). The techniques described herein can be applied to any type of image or image element, but for convenience, the techniques described herein will be discussed with respect to a font.

For example, an image (e.g., raw image) captured of a character with a relatively large font, but far away from the image sensor 216 may still satisfy a per-pixel threshold because the relatively large font size may be resolved from a relatively large distance away from the image sensor 216. Such an example is shown in FIG. 3A.

Figure 3A:
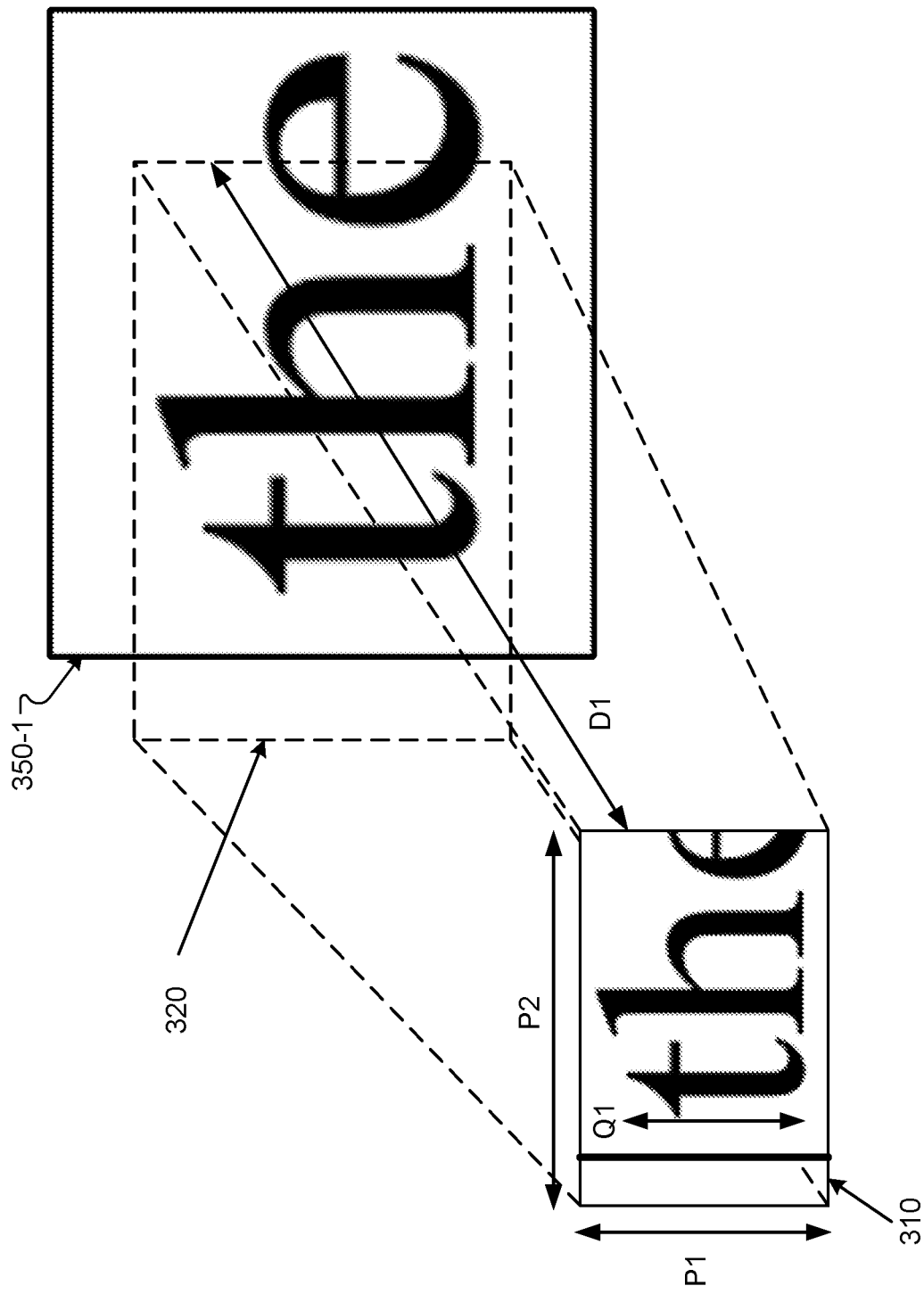
FIGS. 3A through 3C illustrate signs with a printed word that may be viewed within an HMD display in various scenarios.

As shown in FIG. 3A, a sign 350-1 (e.g., a real-world sign) with the word "the" printed on it may be viewed within an HMD display 310 (e.g., display window with pixel size P1×P2) at a distance D1. A field of view 320 associated an outward facing image sensor (e.g., image sensor 216 shown in FIG. 2) of an HMD (not shown) may produce the image (e.g., raw image) within the HMD display 310. In this example, the size of the word "the" on the sign is relatively large at a distance D1 so the size of the word within the HMD display 310 is also relatively large. A size (e.g., a height in this example) in a number of pixels Q1 of the letter "t" from the word "the" may be greater than a threshold (e.g., large enough) such that further processing in a downstream process (e.g., downstream image processing stage 100-2 shown in FIG. 1) may be performed in a desirable fashion.

Referring back to FIG. 2, as another example, an image (e.g., raw image) captured of a character with a relatively small font and far away from the image sensor 216 may not satisfy a per-pixel threshold because the relatively small size may not be resolved from a relatively large distance away from the image sensor 216. Such an example, which is a variation of FIG. 3A, is shown in FIG. 3B.

Figure 3B:
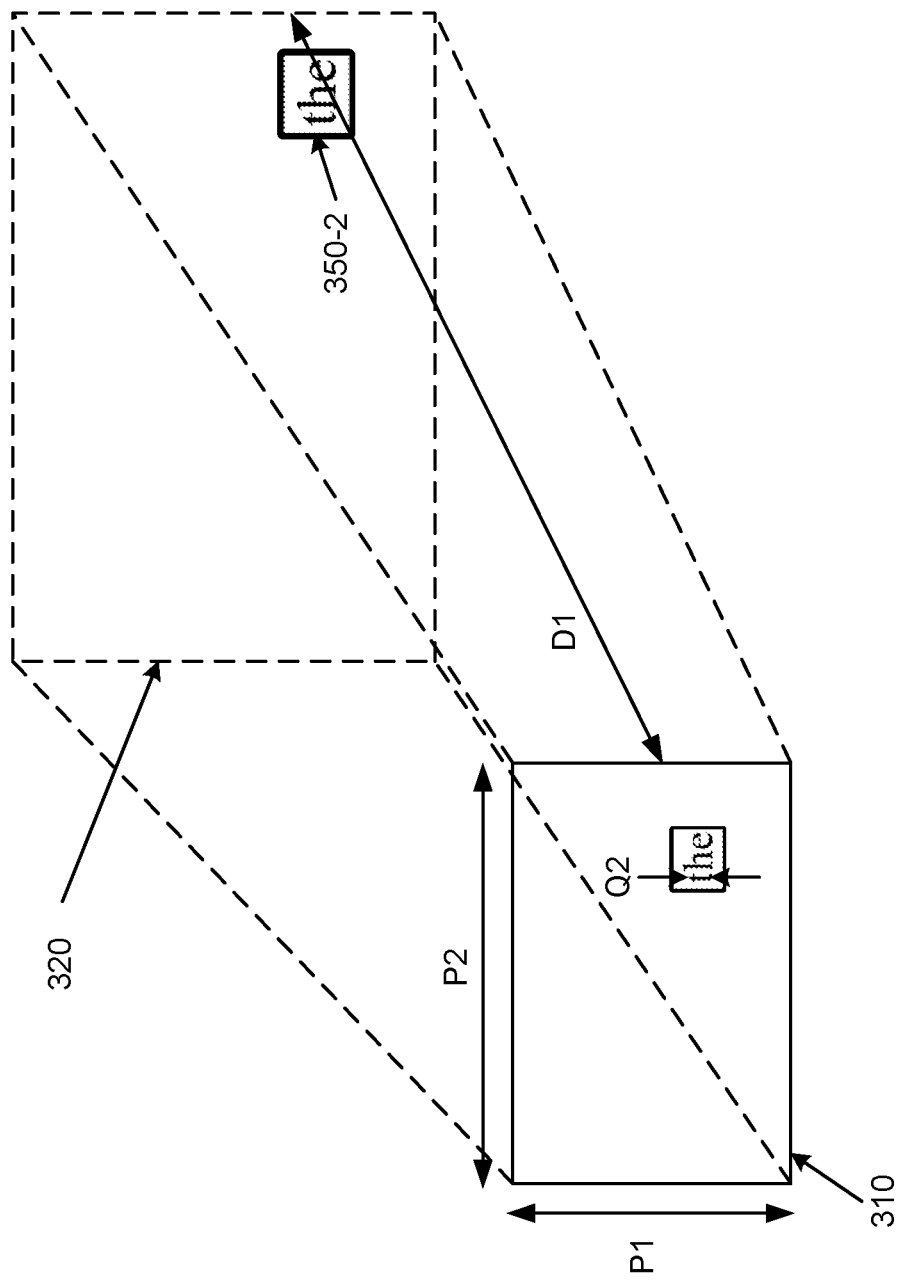

As shown in FIG. 3B, a sign 350-2 (e.g., a real-world sign) with the word "the" printed on it may be viewed within an HMD display 310 (e.g., display window with pixel size P1×P2) at the distance D1 (same distance as in FIG. 3A). A field of view 320 associated an outward facing image sensor of an HMD (not shown) may produce the image (e.g., raw image) within the HMD display 310. In this example, the size of the word "the" on the sign is relatively small at the distance D1 so the size of the word within the HMD display 310 is also relatively small. A size in a number of pixels Q2 of the letter "t" from the word "the" may be smaller than a threshold such that further processing in a downstream process (e.g., downstream image processing stage 100-2 shown in FIG. 1) may not be performed in a desirable fashion. In such a situation, a capture resolution may be increased so that a number of pixels of the word "the" can be increased greater than Q2 so that further processing in a downstream process (e.g., downstream image processing stage 100-2 shown in FIG. 1) may be performed in a desirable fashion.

In some implementations, a low-resolution image (e.g., raw image) and a high-resolution image can be simultaneously captured or captured nearly simultaneously. An assessment as to whether the low-resolution image satisfies a processing condition (e.g., a per-pixel threshold) can be performed. If the low-resolution image satisfies the processing condition, processing of the high-resolution may not be performed or may be excluded. If the low-resolution image does not satisfy the processing condition, an assessment as to whether the high-resolution image satisfies the processing condition (e.g., a per-pixel threshold) can be performed. If the high-resolution image satisfies the processing condition, the high-resolution image may be used for (or may trigger) further processing. If the high-resolution image does not satisfy the processing condition, a higher-resolution image may be captured and an assessment as to whether the higher-resolution image satisfies the processing condition (e.g., a per-pixel threshold) can be performed.

In some implementations, processing can start with a high processing level. For example, in some implementations, a low-resolution image (e.g., raw image) and a high-resolution image (e.g., raw image) can be simultaneously captured or captured nearly simultaneously. An assessment as to whether the high-resolution image satisfies a processing condition (e.g., a per-pixel threshold) can be performed. If the high-resolution image satisfies the processing condition, processing of the low-resolution may not be performed or may be excluded.

In some implementations, processing can start with a high processing level and then decreased until a desirable condition is satisfied. For example, in some implementations, a low-resolution image and a high-resolution image can be simultaneously captured or captured nearly simultaneously. An assessment as to whether the high-resolution image satisfies a processing condition (e.g., a per-pixel threshold) can be performed. If the high-resolution image satisfies the processing condition, an assessment as to whether the low-resolution image satisfies the processing condition (e.g., a per-pixel threshold) can also be performed. If the low-resolution image satisfies the processing condition, the low-resolution image may be used (over the high-resolution image) for (or may trigger) further processing. Images can be captured, and assessed, until a resolution is captured that may result in minimal further processing (as determined based on a processing condition).

As another example, an image (e.g., raw image) captured of a character with a relatively small font, but close to the image sensor 216 may satisfy a per-pixel threshold even though the font is small because the character can be resolved from a relatively short distance. Such an example, which is a variation of FIG. 3B, is shown in FIG. 3C.

Figure 3C:
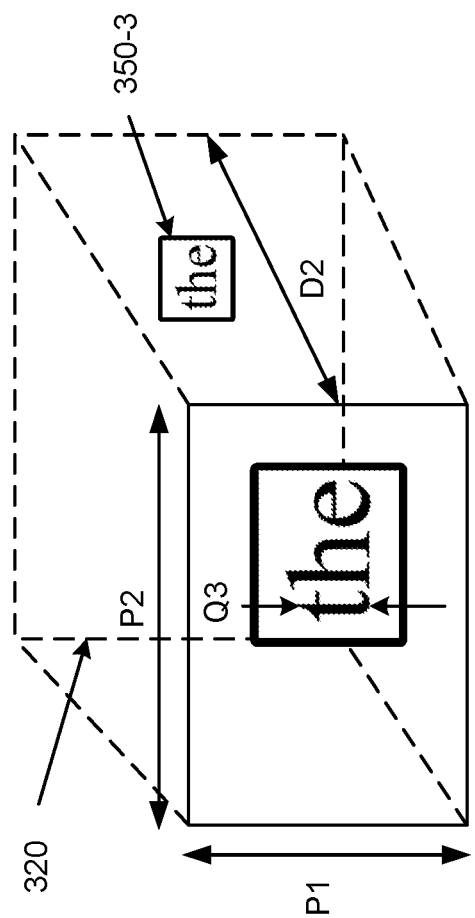

As shown in FIG. 3C, a sign 350-3 (e.g., a real-world sign) with the word "the" printed on it may be viewed within an HMD display 310 (e.g., display window with pixel size P1×P2) at a distance D2 (which is smaller than distance D1 in FIGS. 3A and 3B). A field of view 320 associated an outward facing image sensor of an HMD (not shown) may produce the image (e.g., raw image) within the HMD display 310. In this example, the size of the word "the" on the sign is relatively large at the distance D2 so the size of the word within the HMD display 310 is also relatively large. A size (e.g., a height in this example) in a number of pixels Q3 of the letter "t" from the word "the" may be greater than a threshold (e.g., large enough) such that further processing in a downstream process (e.g., downstream image processing stage 100-2 shown in FIG. 1) may be performed in a desirable fashion.

In accordance with the examples described above, the per-pixel threshold can be a powerful tool for determining an appropriate capture resolution in many situations. The per-pixel threshold can be a single metric that can be determined without information about, for example, font size (e.g., real-world font size) and/or distance.

In some implementations, a per-pixel threshold can be determined based on the script or language of textual information. In some implementations, one or more processing conditions 101 can be based on the angular resolution or visual acuity of the system. The angular resolution can be based on a field of view of an image sensor (e.g., camera) capturing an image (e.g., raw image). In some implementations, one or more processing conditions 101 can be based on sharpness, contrast, accuracy, confidence in identification of a character, and/or so forth.

In some implementations, the image sensor 216 is a red green blue (RGB) camera. In some examples, the image sensor 216 includes a pulsed laser sensor (e.g., a LiDAR sensor) and/or depth camera. For example, the image sensor 216 may be a camera configured to detect and convey information used to make an image, which is represented by the image frames 226. The image sensor 216 can capture and record both images and video.

In operation, the image sensor 216 is configured to obtain (e.g., capture) image data (e.g., optical sensor data) continuously or periodically while the device 100 is activated. In some implementations, the image sensor 216 is configured to operate as an always-on sensor. In some implementations, the imaging sensor 216 may be activated in response to the detection of an object or region of interest.

In some implementations, the computing device 100 includes one or more computing devices, where at least one of the devices is a display device capable of being worn on or in proximity to the skin of a person. In some examples, the computing device 100 is or includes one or more computing device components. In some implementations, the computing device 100 may include a head-mounted display (HMD) device such as an optical head-mounted display (OHMD) device, a transparent heads-up display (HUD) device, a virtual reality (VR) device, an AR device, or other devices such as goggles or headsets having sensors, display, and computing capabilities. In some implementations, the computing device 100 includes AR glasses (e.g., smart glasses). AR glasses represent an optical head-mounted display device designed in the shape of a pair of eyeglasses. In some implementations, the computing device 100 is or includes a smart watch. In some implementations, the computing device 100 is or includes a piece of jewelry. In some implementations, the computing device 100 is or includes a ring controller device or other wearable controller. In some implementations, the computing device 100 is or includes earbuds/headphones or smart earbuds/headphones.

As shown in FIG. 2, the system 200 includes the computing device 100 communicably coupled to a companion device 202 and optionally a server computing device 204. In some implementations, the communicable coupling may occur via a network 206. In some implementations, the communicable coupling may occur directly between computing device 100, companion device 202, and/or server computing device 204.

The computing device 100 includes one or more processors 208, which may be formed in a substrate configured to execute one or more machine executable instructions or pieces of software, firmware, or a combination thereof. The processors 208 can be semiconductor-based and may include semiconductor material that can perform digital logic. The processor 208 may include CPUs, GPUs, and/or DSPs, just to name a few examples.

The computing device 100 can also include one or more memory devices 210. The memory devices 210 may include any type of storage device that stores information in a format that can be read and/or executed by the processor(s) 208. The memory devices 210 may store applications and modules that, when executed by the processor(s) 208, perform certain operations. In some examples, the applications and modules may be stored in an external storage device and loaded into the memory devices 210. The memory 210 may include or have access to buffers 212, for example, to store and retrieve image content and/or audio content for the device 100.

The sensor system 214 may also include an inertial motion unit (IMU) sensor 218. The IMU sensor 218 may detect motion, movement, and/or acceleration of the computing device 100. The IMU sensor 218 may include various different types of sensors such as, for example, an accelerometer, a gyroscope, a magnetometer, and other such sensors.

In some implementations, the sensor system 214 may also include an audio sensor 220 configured to detect audio received by computing device 100. The sensor system 214 may include other types of sensors such as a light sensor, a distance and/or proximity sensor, a contact sensor such as a capacitive sensor, a timer, and/or other sensors and/or different combination(s) of sensors. The sensor system 214 may be used to obtain information associated with a position and/or orientation of computing device 100.

The computing device 100 may also include one or more antennas 242 configured to communicate with other computing devices via wireless signals. For example, the computing device 100 may receive one or more wireless signals and use the wireless signals to communicate with other devices such as companion device 202 and/or server computing device 204, or other devices within range of antennas 242. The wireless signals may be triggered via a wireless connection such as a short-range connection (e.g., Bluetooth connection or near-field communication (NFC) connection) or an Internet connection (e.g., Wi-Fi or mobile network).

The computing device 100 includes a display 244. The display 244 may include a liquid crystal display (LCD), a light-emitting diode (LED) display, an organic light-emitting display (OLED), an electro-phoretic display (EPD), or a micro-projection display adopting an LED light source. In some examples, the display 244 is projected onto the field of view of the user. In some examples, in the case of AR glasses, the display 244 may provide a transparent or semi-transparent display such that a user wearing the AR glasses can view images provided by the display 244 but also information located in the field of view of the AR glasses behind the projected images.

The computing device 100 also includes a control system 246 including various control system devices to facilitate operation of the computing device 100. The control system 246 may utilize processor 208 and/or sensor system 214 operably coupled to the components of the computing device 100.

The computing device 100 also includes a UI renderer 250. The UI renderer 250 may function with the display 244 to depict user interface objects or other content to the user of the computing device 100. For example, the UI renderer 250 may receive images captured by the device 100 to generate and render additional user interface content on the display 244.

The computing device 100 also includes a communication module 252. The communication module 252 may enable the computing device 100 to communicate to exchange information with another computing device within range of the device 100. For example, the computing device 100 may be operably coupled to another computing device, to facilitate communication via, for example, a wired connection, a wireless connection via for example, Wi-Fi or Bluetooth, or other type of connection.

In some implementations, the computing device 100 is configured to communicate with the server computing device 204 and/or the companion device 202 over the network 206. The server computing device 204 may represent one or more computing devices that take the form of a number of different devices, for example a standard server, a group of such servers, or a rack server system. In some implementations, the server computing device 204 is a single system sharing components such as processors and memories. The network 206 may include the Internet and/or other types of data networks, such as a local area network (LAN), a wide area network (WAN), a cellular network, satellite network, or other types of data networks. The network 206 may also include any number of computing devices (e.g., computer, servers, routers, network switches, etc.) that are configured to receive and/or transmit data within network 206.

Figure 4A:
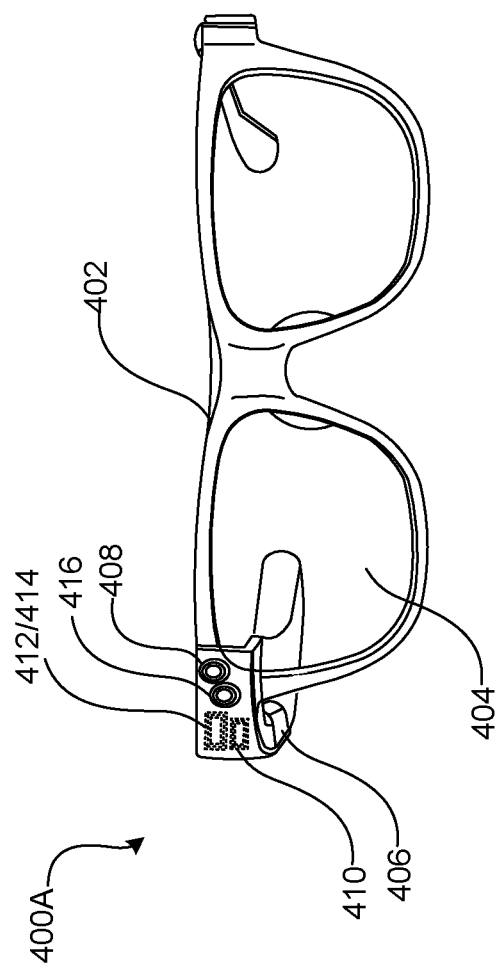
FIGS. 4A and 4B illustrate an example of a wearable computing device, according to implementations described throughout this disclosure.
Figure 4B:
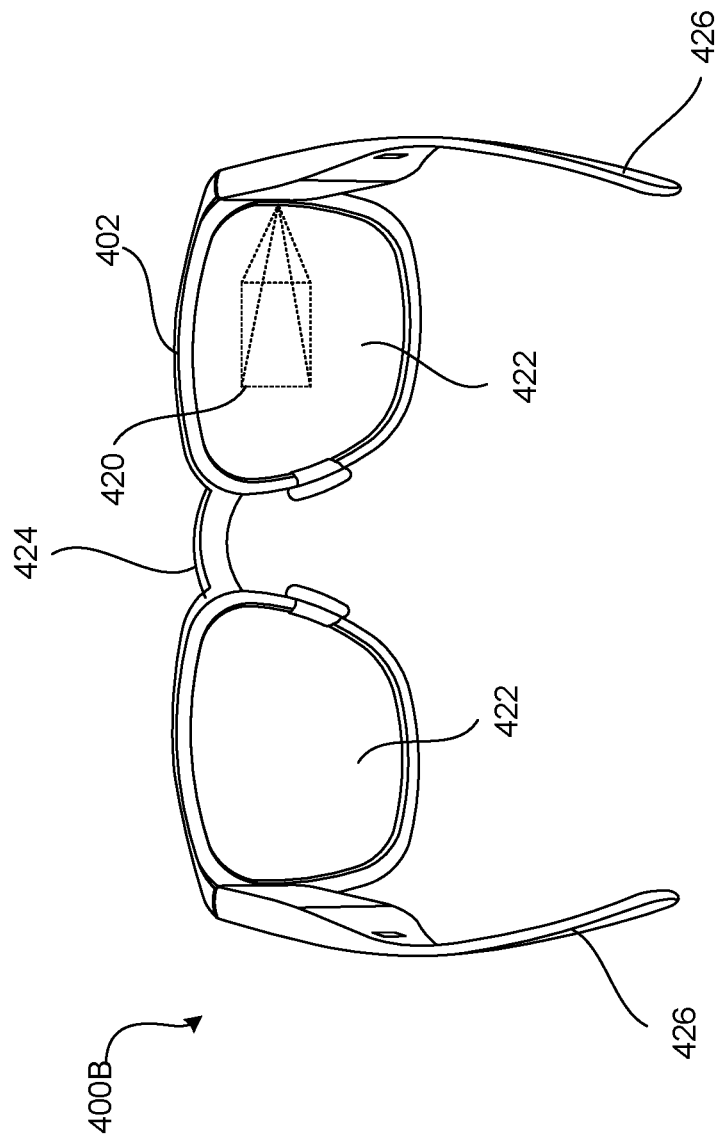

FIGS. 4A and 4B illustrate various views of an example of an AR wearable computing device, according to implementations described throughout this disclosure. FIG. 4A is a front view of an example of a wearable computing device, according to implementations described throughout this disclosure. In this example, the wearable computing device is a pair of AR glasses 400A (e.g., wearable computing device 100 in FIG. 1). In general, the AR glasses 400A may include any or all components of system 200. AR glasses 400A may also be indicated as smart glasses representing an optical head-mounted display device designed in the shape of a pair of eyeglasses. For example, smart glasses are glasses that add information (e.g., project a display) alongside what the wearer views through the glasses.

Although AR glasses 400A are shown as the wearable computing device described herein, other types of wearable computing devices are possible. For example, the wearable computing device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable computing device may be a watch, a mobile device, a piece of jewelry, a ring controller, or other wearable controller.

As shown in FIG. 4A, the AR glasses 400A include a frame 402, with a display device 404 coupled in the frame 402 (or in the glass portion of frame 402). The AR glasses 400A also include an audio output device 406, an illumination device 408, a sensing system 410, a control system 412, at least one processor 414, and a camera 416.

The display device 404 may include a see-through near-eye display such as those using birdbath or waveguide optics. For example, such an optical design may project light from a display source onto a portion of teleprompter glass functioning as a beamsplitter seated at a 45 degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, etc.) generated by the display. In some implementations, waveguide optics may be used to depict content on display device 404 of AR glasses 400A.

The audio output device 406 (e.g., one or more speakers) may be coupled to the frame 402. The sensing system 410 may include various sensing devices and the control system 412 including various control system devices to facilitate operation of the AR glasses 400A. The control system 412 may include a processor 414 operably coupled to the components of the control system 412.

The camera 416 may be capable of capturing still and/or moving images. In some implementations, the camera 416 may be a depth camera that can collect data related to distances of external objects from the camera 416. In some implementations, the camera 416, may be a point tracking camera that can, for example, detect and follow one or more optical markers on an external device, such as, for example, optical markers on an input device or finger on a screen. In some implementations, the AR glasses 400A may include an illumination device 408 that may selectively operate, for example, with the camera 416, for detection of objects (e.g., virtual and physical) in the field of view of the camera 416. The illumination device 408 may selectively operate, for example, with the camera 416, for detection of objects in the field of view of the camera 416.

The AR glasses 400A may include a communication module (e.g., communication module 252) in communication with processor 414 and control system 412. The communication module may provide for communications between devices housed within AR glasses 400A as well as communication with external devices, such as, for example, controllers, mobile devices, servers, and/or other computing devices. The communication module may enable the AR glasses 400A to communicate to exchange information with another computing device and authenticate other devices within range of the AR glasses 400A or other identifiable element in the environment. For example, the AR glasses 400A may be operably coupled to another computing device, to facilitate communication via, for example, a wired connection, a wireless connection via for example, Wi-Fi or Bluetooth, or other type of connection.

FIG. 4B is a rear view 400B of the AR glasses 400A, according to implementations described throughout this disclosure. The AR glasses 400B may be an example of the wearable computing device 100 of FIG. 1. The AR glasses 400B are glasses that add information (e.g., project a display 420) alongside what the wearer views through the glasses. In some implementations, instead of projecting information, the display 420 is an in-lens micro display. In some implementations, AR glasses 400B (e.g., eyeglasses or spectacles), are vision aids, including lenses 422 (e.g., glass or hard plastic lenses) mounted in the frame 402 that holds the lenses in front of a person's eyes, typically utilizing a bridge 424 over the nose, and bows 426 (e.g., temples or temple pieces) which rest over the ears.

Figure 5:
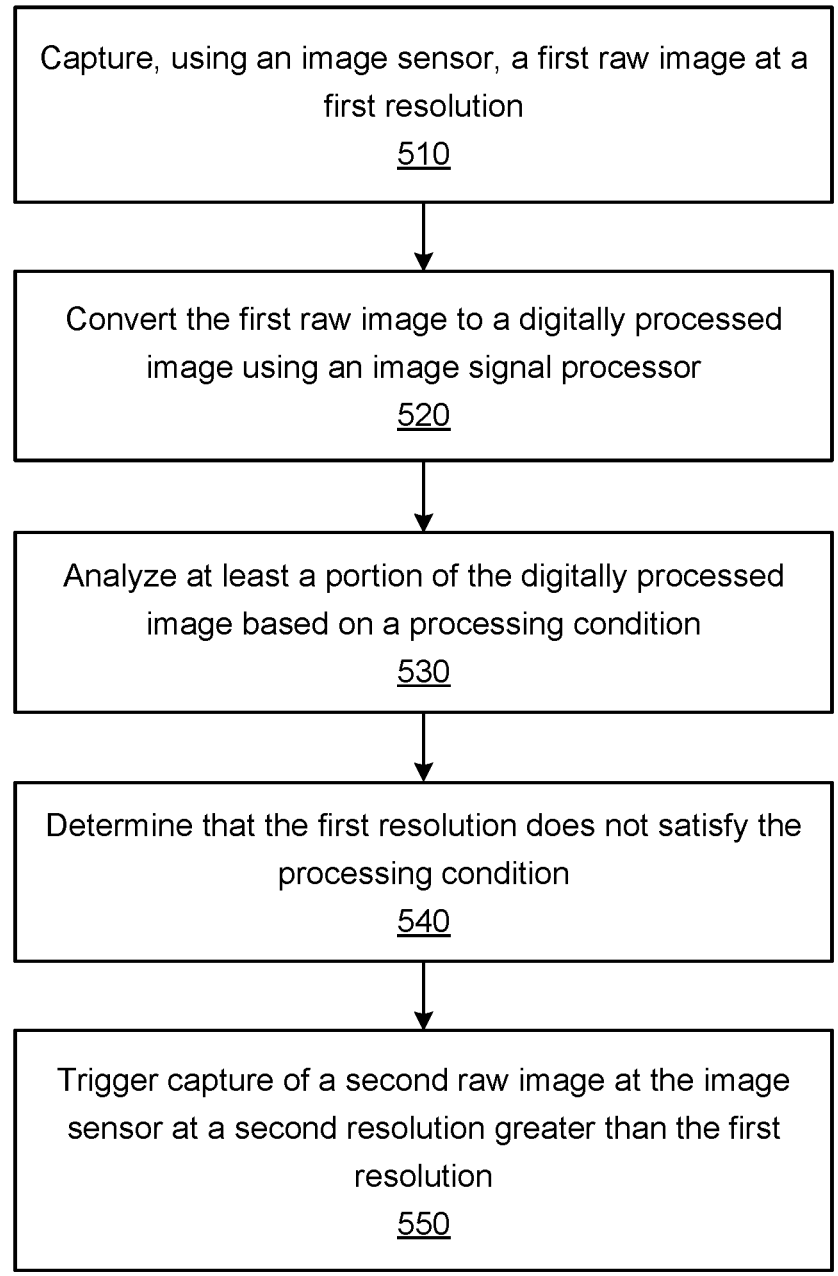
FIG. 5 is a flowchart that illustrates a method related to the implementations described herein.

FIG. 5 is a flowchart that illustrates a method related to the implementations described herein. The method can be performed within the capture parameter selection processing stage 100-1 shown in at least FIGS. 1 and 2.

The method can include capturing, using an image sensor, a first raw image at a first resolution (block 510). The first image can be captured using, for example, the image sensor 216 shown in FIG. 2. The first resolution can be included within the resolution capture parameter(s) 221 shown in FIG. 2.

The method can include converting the first raw image to a digitally processed image using an image signal processor (block 520). The image signal processor can be, for example, the image signal processor 224 shown in FIG. 2.

The method can include analyzing at least a portion of the digitally processed image based on a processing condition (block 530). The analyzing can be performed at, for example, the parameter selection processor 227 shown in FIG. 2. The processing conditions can include, for example, the processing condition(s) 101 shown in FIG. 1. A specific example of processing conditions is shown as resolution processing conditions 222 shown in FIG. 1.

The method can include determining that the first resolution does not satisfy the processing condition (block 540). The determining can be performed at, for example, the parameter selection processor 227 shown in FIG. 2. The determining can be based on the resolution selection algorithm 223 shown in FIG. 2.

The method can include triggering capture of a second raw image at the image sensor at a second resolution greater than the first resolution (block 550). The second image can be captured using, for example, the image sensor 216 shown in FIG. 2. The second resolution can be included within the resolution capture parameter(s) 221 shown in FIG. 2.

Figure 6:
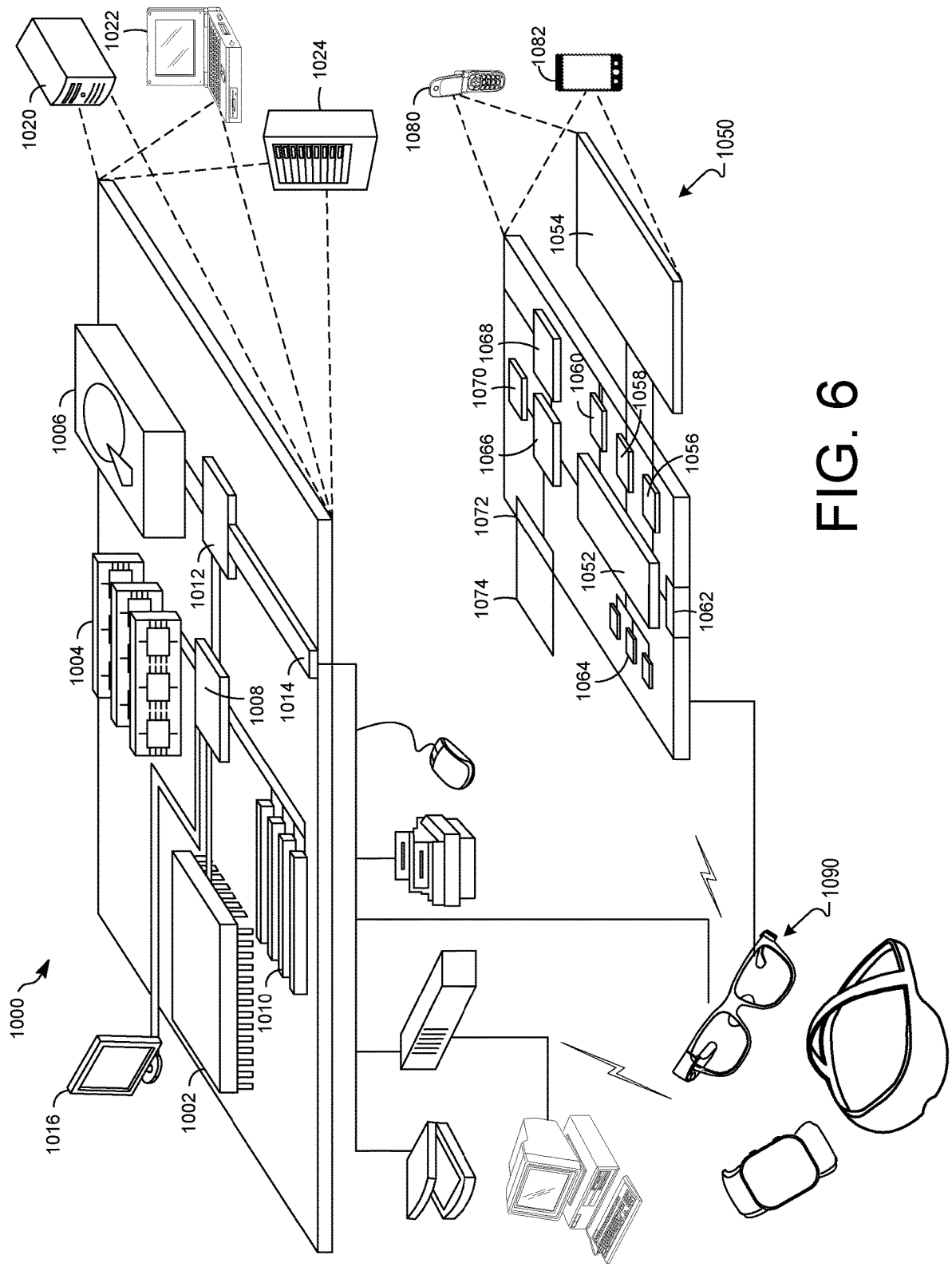
FIG. 6 illustrates an example of a computer device and a mobile computer device, which may be used with the techniques described herein.

FIG. 6 illustrates an example of a computer device 1000 and a mobile computer device 1050, which may be used with the techniques described here (e.g., to implement the client computing device 100, the server computing device 204, and/or mobile device 202). The computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display), and LED (Light Emitting Diode) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 1090 to generate an augmented environment for viewing inserted content within the physical space. For example, one or more sensors included on a computing device 1050 or other computing device depicted in the figure, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090. The user's interactions with the computing device may be translated to interactions with a user interface generated in the AR environment for a controllable device.

In some implementations, a computing device 1050 may include a touchscreen. For example, a user can interact with the touchscreen to interact with a user interface for a controllable device. For example, the touchscreen may include user interface elements such as sliders that can control properties of the controllable device.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations of the subject matter described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An image processing method comprising:
   capturing, using an image sensor of a wearable computing device, a first image at a first resolution and a second image at a second resolution lower than the first resolution, the first image and the second image including textual information;
   analyzing at least a portion of the first image based on a processing condition, the processing condition being based on a size of the textual information;
   determining, based on the analyzing of at least the portion of the first image, that the first resolution satisfies the processing condition;
   determining, in response to the determining that the first resolution satisfies the processing condition, that the second resolution also satisfies the processing condition; and
   transmitting at least a portion of the second image from the wearable computing device to a companion device for further processing, the companion device being a mobile device connected with the wearable computing device.

2. The image processing method of claim 1, wherein the textual information included in the first image includes a word in a script or language, and the processing condition is analyzed based on the script or language.

3. The image processing method of claim 1, wherein the first image and the second image further include a real-world object.

4. The image processing method of claim 1, wherein the analyzing of the processing condition includes measuring a number of pixels of a character included within the textual information.

5. The image processing method of claim 1, wherein the first resolution corresponds with a binning of pixels defined at the image sensor.

6. The image processing method of claim 1, wherein the first resolution is a default resolution, the second resolution is defined based on an entry in a look-up table.

7. The image processing method of claim 1, wherein:
   the determining that the second resolution also satisfies the processing condition is based on analyzing at least the portion of the second image based on the processing condition; and
   the transmitting of the at least the portion of the second image to the companion device for further processing is performed in response to the determining that the second resolution also satisfies the processing condition.

8. A non-transitory machine-readable, tangible medium storing instructions read and executed by one or more processors of a wearable computing device to perform a method comprising:
   capturing, using an image sensor of the wearable computing device, a first image at a first resolution and a second image at a second resolution lower than the first resolution, the first image and the second image including textual information;
   analyzing at least a portion of the first image based on a processing condition, the processing condition being based on a size of the textual information;
   determining, based on the analyzing of at least the portion of the first image, that the first resolution satisfies the processing condition;
   determining, in response to the determining that the first resolution satisfies the processing condition, that the second resolution also satisfies the processing condition; and
   transmitting at least a portion of the second image from the wearable computing device to a companion device for further processing, the companion device being a mobile device connected with the wearable computing device.

9. The method of claim 8, wherein the textual information included in the first image includes a word in a script or language, and the processing condition is analyzed based on the script or language.

10. The method of claim 8, wherein the first image and the second image further include a real-world object.

11. The method of claim 8, wherein the analyzing of the processing condition includes measuring a number of pixels of a character included within the textual information.

12. The method of claim 8, wherein the first resolution corresponds with a binning of pixels defined at the image sensor.

13. The method of claim 8, wherein the first resolution is a default resolution, the second resolution is defined based on an entry in a look-up table.

14. The method of claim 8, wherein:
    the determining that the second resolution also satisfies the processing condition is based on analyzing at least the portion of the second image based on the processing condition; and
    the transmitting of the at least the portion of the second image to the companion device for further processing is performed in response to the determining that the second resolution also satisfies the processing condition.

15. A system, comprising:
    a wearable computing device;
    an image sensor of the wearable computing device;
    a processor of the wearable computing device; and
    a memory device communicatively coupled to the processor and having stored therein a plurality of instructions, which when executed by the processor, cause the processor to:
    capture, using the image sensor, a first image at a first resolution and a second image at a second resolution lower than the first resolution, the first image and the second image including textual information;

analyze at least a portion of the first image based on a processing condition, the processing condition being based on a size of the textual information;

determine, based on the analyzing of at least the portion of the first image, that the first resolution satisfies the processing condition;

determine, in response to the processing condition being satisfied for the first resolution, that the second resolution also satisfies the processing condition; and transmit at least a portion of the second image from the wearable computing device to a companion device for further processing, the companion device being a mobile device connected with the wearable computing device.

16. The system of claim 15, wherein the textual information included in the first image includes a word in a script or language, and the processing condition is analyzed based on the script or language.

17. The system of claim 15, wherein the first image and the second image further include a real-world object.

18. The system of claim 15, wherein the analyzing of the processing condition includes measuring a number of pixels of a character included within the textual information.

19. The system of claim 15, wherein the first resolution corresponds with a binning of pixels defined at the image sensor.

20. The system of claim 15, wherein the first resolution is a default resolution, the second resolution is defined based on an entry in a look-up table.

21. The system of claim 15, wherein:

the determining that the second resolution also satisfies the processing condition is based on analyzing at least the portion of the second image based on the processing condition; and the transmitting of the at least the portion of the second image to the companion device for further processing is performed in response to the determining that the second resolution also satisfies the processing condition.

* * * * *